US011795610B2

(12) United States Patent
Lalgudi et al.

(10) Patent No.: US 11,795,610 B2
(45) Date of Patent: Oct. 24, 2023

(54) COATING MATERIALS, AND PERSONAL PROTECTIVE CLOTHING ITEMS COATED WITH THE COATING MATERIALS

(71) Applicant: Battelle Memorial Institute, Columbus, OH (US)

(72) Inventors: Ramanathan S. Lalgudi, Columbus, OH (US); Robert J. Cain, Columbus, OH (US); Krenar Shqau, Columbus, OH (US); Erik W. Edwards, Columbus, OH (US)

(73) Assignee: Battelle Memorial Institute, Columbus, OH (US)

( * ) Notice: Subject to any disclaimer, the term of this patent is extended or adjusted under 35 U.S.C. 154(b) by 29 days.

(21) Appl. No.: 17/455,568

(22) Filed: Nov. 18, 2021

(65) Prior Publication Data

US 2022/0074128 A1 Mar. 10, 2022

Related U.S. Application Data

(62) Division of application No. 16/308,324, filed as application No. PCT/US2017/036402 on Jun. 7, 2017, now Pat. No. 11,220,781.

(60) Provisional application No. 62/346,588, filed on Jun. 7, 2016.

(51) Int. Cl.
*D06M 11/36* (2006.01)
*A41D 31/04* (2019.01)
*A41D 13/00* (2006.01)
*A41D 31/02* (2019.01)
*A62B 17/00* (2006.01)
*D06M 15/19* (2006.01)
*D06M 23/08* (2006.01)
*A62D 5/00* (2006.01)
*C09D 7/63* (2018.01)
*C09D 7/61* (2018.01)
*D06M 15/657* (2006.01)
*D06M 11/46* (2006.01)
*C09D 5/00* (2006.01)
*C09D 183/04* (2006.01)

(52) U.S. Cl.
CPC ............ *D06M 11/36* (2013.01); *A41D 13/00* (2013.01); *A41D 31/02* (2013.01); *A41D 31/04* (2019.02); *A62B 17/006* (2013.01); *A62D 5/00* (2013.01); *C09D 5/00* (2013.01); *C09D 7/61* (2018.01); *C09D 7/63* (2018.01); *C09D 183/04* (2013.01); *D06M 11/46* (2013.01); *D06M 15/19* (2013.01); *D06M 15/657* (2013.01); *D06M 23/08* (2013.01); *D06M 2200/30* (2013.01)

(58) Field of Classification Search
CPC .. D06M 11/36; D06M 2200/30; D06M 15/19; D06M 23/08; D06M 15/657; D06M 11/46; A41D 13/00; A41D 31/02; A41D 31/04; A62B 17/006; A62D 5/00; C09D 7/63; C09D 7/61; C09D 5/00; C09D 183/04
USPC ........................................................ 524/130
See application file for complete search history.

(56) References Cited

U.S. PATENT DOCUMENTS

| 7,879,935 | B2 | 2/2011 | Lalgudi |
| 8,129,069 | B2 | 3/2012 | Lalgudi |
| 8,883,935 | B2 | 11/2014 | Lalgudi et al. |
| 9,000,203 | B2 | 4/2015 | Lalgudi |
| 2003/0224174 | A1 | 12/2003 | White et al. |
| 2012/0271063 | A1 | 10/2012 | Lalgudi et al. |

FOREIGN PATENT DOCUMENTS

| CN | 1263544 A | | 8/2000 |
| CN | 1665895 A | | 9/2005 |
| CN | 102755907 A | | 10/2012 |
| CN | 103045088 A | | 4/2013 |
| CN | 105200662 A | | 12/2015 |
| DE | 202006005910 U1 | | 6/2006 |
| EP | 0898985 A1 | | 3/1999 |
| JP | 2000119956 A | | 4/2000 |
| JP | 2000328439 A | * | 11/2000 |
| JP | 2000328439 A | | 11/2000 |
| KR | 20160011595 A | | 2/2016 |
| WO | 9946010 | | 9/1999 |
| WO | 2007141781 A2 | | 12/2007 |
| WO | 2016135344 A1 | | 9/2016 |
| WO | 2017214304 A1 | | 12/2017 |

OTHER PUBLICATIONS

International Search Report and Written Opinion, PCT/US2017/036402, dated Sep. 12, 2017.
US Enviromental Protection Agency, Toxilogical Review of Cerium Oxide and Cerium Compounds in Support of Summary Information on the Integrated Risk Information System (IRIS), Sep. 2009.
Masahiro Asano, et al., Decomposition of Benzo (a) Pyrene on Artificial Sea Water Using of UV/Photocatalytic Dxidation Process, 13th World Lake Conference, Nov. 1-5, 2009, Wuhan, Hubei Province, China.
Homem, Vera, et al., Preliminary Feasibility Study of Benzo(a)Pyrene Oxidative Degradation by Fenton Treatment, Hindawi Publishing Corporation, Journal of Environmental and Public Health, vol. 2009, Article 1D 149034.
Strunk, Jennifer, et al., Synthesis of Different CeO2 Structures on the Mesoporous Silica and Characterization of Their Reduction Properties, The Journal of Physical Chemistry, 115, 4114-4126, California, 2011.

(Continued)

*Primary Examiner* — Hui H Chin
(74) *Attorney, Agent, or Firm* — Greer, Burns & Crain, Ltd.

(57) ABSTRACT

Coating materials and coated personal protective clothing items incorporating the coating material are described. The coating material includes a polymeric component; a metal oxide component; and a catalytic component. The catalytic component includes a metal oxide or a mixed metal oxide which is an effective catalyst for an oxidation reaction. The coated personal protective clothing item includes a personal protective clothing substrate with a coating including the coating material.

16 Claims, No Drawings

(56) References Cited

OTHER PUBLICATIONS

Ferrandon, Magali, Mixed Metal Oxide—Noble Metal Catalysts for Total Oxidation of Volatile Organic Compounds and Carbon Monoxide, Department of Chemical Engineering and Technology, Chemical Reaction Engineering, Stockholm, 2001.

Zhang, Xuebin, et al., Room-Temperature Catalytic Oxidation of Benzo(a)pyrene by Ce-SBA-15 Supported Active CeSiO4 Phase, Applied Catalysis B: Enviromental 127 (2012), 105-111.

Fent, Kenneth W., et al., Contamination of firefighter personal protective equipment and skin and the effectiveness of decontamination procedures, Journal of Occupational and Enviromental Hygiene, (2017) 14:10, 801-814, DOI 10.1080/15459624.2017.1334904.

International Search Report and Written Opinion for PCT Application No. PCT/US2017/064739, dated Aug. 20, 2018.

* cited by examiner

COATING MATERIALS, AND PERSONAL PROTECTIVE CLOTHING ITEMS COATED WITH THE COATING MATERIALS

This application is a divisional application of U.S. patent Ser. No. 16/308,324 which was filed on Dec. 7, 2018, which was a U.S. National Phase application under 35 U.S.C. § 371 of International Application No. PCT/US2017/36402, filed Jun. 7, 20217, which claims priority to U.S. Provisional Application No. 62/346,588, which was filed Jun. 7, 2016, the contents of each of which are hereby incorporated by reference in their entirety.

BACKGROUND OF THE INVENTION

Smoke produced by residential, industrial and forest fires contains air-borne carcinogens and toxic soot particles. A major carcinogenic concern is polycyclic aromatic hydrocarbons (PAHs) such as benzo[a]pyrene, benzo[e]pyrene, benz[a]anthracene, benzo[k]fluoranthene, fluorene, anthracene, fluoranthene. These are compounds with two or more fused aromatic rings, containing only carbon and hydrogen. They are endocrine disrupting as well as tumorigenic substances. Benzo(a)pyrene (BaP) is one of the most toxic PAHs.

When firefighters are exposed to fires, the PAHs can be deposited on the surface of their uniforms. There is a need to remove these compounds safely from the uniforms.

Currently, the PAHs are removed by washing. However, while this works, it also exposes other clothing to the PAHs, which is undesirable.

Therefore, there is a need to remove and/or reduce the PAHs from clothing before laundering to reduce or eliminate further exposure to the PAHs.

DETAILED DESCRIPTION OF THE INVENTION

The present invention relates in general to coating materials and their applications. One aspect of the invention involves coating materials that oxidize polyaromatic hydrocarbons such as benzo[a]pyrene, benzo[e]pyrene, benz[a]anthracene, benzo[k]fluoranthene, fluorene, anthracene, fluoranthene and combinations thereof. The coating material includes three components: a metal oxide component, a catalytic component, and a polymeric component.

Another aspect of the invention involves the use of the coating materials for protective purposes. In one embodiment, they can be used on clothing, such as the turnout clothing worn by firefighters, to protect against harmful materials in the environment. In another embodiment, the coating materials are used in health care applications, such as wound healing, diagnostic methods, or medical devices.

When applied to protective clothing, the metal oxide component can reduce the adherence of harmful materials on the clothing. The catalytic component can modify materials that come into contact with the clothing to make them less harmful. The polymeric component binds the metal oxide component and the catalytic component to the clothing and also reduces the adherence of the harmful materials on the clothing.

Another aspect of the invention involves a composition. The composition includes a metal oxide component, a catalytic component, and a polymeric component.

Metal Oxide Component of the Coating Material

In certain embodiments, the metal oxide component of the coating material includes an amphiphilic compound. As is well known, amphiphilic compounds are composed of hydrophilic and hydrophobic portions. The compound can include any suitable hydrophilic and hydrophobic portions.

In a particular embodiment, the amphiphilic compound is described in U.S. Pat. No. 9,000,203 by Lalgudi et al., issued Apr. 7, 2015, which is incorporated by reference herein. The amphiphilic compound includes a covalently linked ionic moiety with the following structural formula:

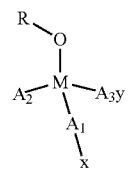

where M=metal oxide or binary metal oxide, $A_1$ is selected from compounds with surface energy greater than or equal to 25 dynes per centimeter, $A_2$ is selected from compounds with surface energy greater than or equal to 12 dynes per centimeter, $A_3$ is selected from compounds having more than one reactive functional group, x=$NH_2$, NHR' or NR'$_2$ (R'=methyl, ethyl, propyl or isopropyl), y=COOH, $SO_3H$ or $PO_3H$, and R=H or halogen; and where one of the $A_{1-x}$, $A_2$, or $A_{3-y}$ may be replaced by a second O—R. In certain embodiments, the compound includes all of the $A_{1-x}$, $A_2$, and $A_{3-y}$ groups.

In the structural formulas shown above, A1 can be selected from any suitable compound(s) with surface energy greater than or equal to 25 dynes per centimeter, or 25 dynes per centimeter to 40 dynes per centimeter, or 25 dynes per centimeter to 30 dynes per centimeter. In certain embodiments, A1 is selected from one or more reactive silanes which include, but are not limited to, trimethoxy[3-(methylamino)-propyl]silane, (N,N-dimethylaminopropyl)-trimethoxysilane, (3-aminopropyl)-triethoxysilane, N-[3-(trimethoxysilyl)propyl]-ethylenediamine, 3-[bis(2-hydroxyethyl)-amino]propyl-triethoxysilane, amino functional poly(dimethylsiloxane), diethoxy(3-glycidyloxypropyl)methylsilane, (3-glycidyloxypropyl)trimethoxysilane and 3-(triethoxysilyl)propyl isocyanate.

In the structural formula, A2 can be selected from any suitable compound(s) with surface energy greater than or equal to 12 dynes per centimeter, or greater than or equal to 12 dynes per centimeter and less than or equal to 25 dynes per centimeter. In certain embodiments, A2 is selected from one or more reactive silanes which include, but are not limited to, silanes containing perfluoroalkyl, silicone and hydrocarbon functionalities.

In the structural formula, A3 can be selected from any suitable compound(s) having more than one reactive functional group. In certain embodiments, the compounds having more than one reactive functional group are selected from the group consisting of hydroxyl containing carboxylic acids, and hydroxyl containing sulfonic acids.

M can be oxides of Si, Zr, Ti, Pt, or mixtures thereof.

In another embodiment, the amphiphilic compound includes a covalently linked ionic moiety with the following structural formula:

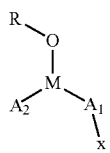

where M=metal oxide or binary metal oxide,
$A_1$ is selected from compounds with surface energy greater than or equal to 25 dynes per centimeter,
$A_2$ is selected from compounds with surface energy greater than or equal to 7 dynes per centimeter,
x=$NH_2$, $NHR'$ or $NR'_2$ ($R'$=methyl, ethyl, propyl or isopropyl), and
R=H or halogen; and
where one of the $A_{1-x}$, or $A_2$ may be replaced by a second O—R. In certain embodiments, the compound includes both the $A_{1-x}$, and $A_2$ groups.

M and the A1 group are described above.

The A2 group can be selected from any suitable compound(s) with surface energy greater than or equal to 7 dynes per centimeter, or greater than or equal to 7 dynes per centimeter and less than or equal to 25 dynes per centimeter, or greater than or equal to 7 dynes per centimeter and less than or equal to 17 dynes per centimeter. In certain embodiments, A2 is selected from one or more reactive silanes which include, but are not limited to, silanes containing perfluoroalkyl, silicone, and hydrocarbon functionality.

The hydrophilic portion of the metal oxide component of the coating can be anionic, cationic, zwitterionic and/or amphoteric. In one particular embodiment, it is cationic. The hydrophobic portion of the metal oxide component of the coating can be any suitable compounds with hydrophobic properties. In one particular embodiment, it is a perfluoro alkyl compound.

The metal oxide component can be prepared by any suitable method. Different methods of making ionic compounds (namely surfactants and ion exchange resins) are well known and are exemplified in the following patents: U.S. Pat. Nos. 5,645,883, 4,918,210 and 4,066,592.

In a particular example, the metal oxide component is made by hydrophobic modification of compounds containing cationic subunits. In another example, the amphiphilic compound is made by hydrophobic modification of compounds containing zwitterionic subunits. In another example, cationic compounds with reactive functional groups are modified to obtain the amphiphilic compound. For example, the cationic compound with functional groups can be reacted with functionally derived fluoropolymer and/or poly(dimethylsiloxane) to obtain an amphiphilic cationic compound.

The metal oxide may be included in the metal oxide component in an amount of from about 1% to about 50% by weight, or about 1% to about 45% by weight, or about 1% to about 40% by weight, or about 1% to about 30% by weight, or about 5% to about 30% by weight, or about 5% to about 25% by weight, or about 5% to about 20% by weight, or about 8% to about 20% by weight.

Catalytic Component of the Coating Material

The catalytic component of the coating material is comprised of a metal oxide or a mixed metal oxide which is an effective catalyst for an oxidation reaction. In certain embodiments, the metal oxide is an oxide of one or more of the following metals: cerium, cesium, zirconium, chromium, molybdenum, tungsten, lanthanum, silver, vanadium, manganese, iron, cobalt, nickel or copper.

The metal oxide can be in any suitable oxidation state. For example, the metal oxide can be in oxidation state 0, 1, 2, 3 or 4 depending on the particular oxide and the conditions.

The catalytic component of the coating material may further comprise a support for the metal oxide, such as a support made from silica, alumina, zirconia, titania, clay, carbon or mixtures thereof.

In certain embodiments, the catalytic component is comprised of metal oxide nanoparticles having a particle size greater than 1 nm and less than 200 nm, and in some embodiments greater than 1 nm and less than 175 nm, or greater than 1 nm and less than 150 nm, or greater than 1 nm and less than 125 nm, or greater than 1 nm and less than 100 nm, or greater than 6 nm and less than 200 nm, or greater than 6 nm and less than 175 nm, or greater than 6 nm and less than 150 nm, or greater than 6 nm and less than 125 nm, or greater than 6 nm and less than 100 nm.

In certain embodiments, the metal oxide catalyst includes cerium oxide (also called "ceria"). Cerium metal is very reactive and is a strong oxidizing agent that is stabilized when associated with an oxygen ligand. When present in cerium oxide and other compounds, cerium exists in both the tetravalent state ($Ce^{4+}$, ceric) and the trivalent state ($Ce^{3+}$, cerous). Cerium(IV) oxide has the structural formula $CeO_2$ and cerium(III) oxide has the structural formula $Ce_2O_3$.

Cerium oxide may be manufactured in the form of a powder, or in the form of a dispersion or solution of particles in a liquid carrier or solvent. For example, the carrier or solvent may be selected from alcohols, ethers, esters, ketones, water, halogenated solvents, aromatic solvents, or mixtures thereof. The concentration of the cerium oxide particles can be adjusted for different applications.

Cerium oxide particles, in powder form or in a dispersion or solution, usually have a particle size in the nanoscale range. For example, the cerium oxide nanoparticles may have a particle size not greater than 200 nm, not greater than 100 nm, not greater than 75 nm, not greater than 50 nm, or not greater than 25 nm. Particle size may be measured by Transmission Electron Microscopy (TEM) or any other suitable method.

Numerous manufacturers produce cerium oxide nanoparticles in various powder, dispersion and solution forms. Manufacturers include, for example, Sigma-Aldrich, US Research Nanomaterials, Inc., and Meliorum Technologies.

In certain embodiments, the cerium oxide nanoparticles are prepared by a sol-gel process. In this process, a precursor of cerium oxide, such as a cerium alkoxide, is dissolved in a liquid solvent. The solvent may be water, an organic liquid, or others depending on the particular process. A stabilizer, such as tetramethylammonium hydroxide (TMAOH), can be added to the solution to control the growth of nanoparticles by avoiding aggregation of individual nanoparticles. The solution (the "sol") gradually evolves towards the formation of a gel-like diphasic system (the "gel") containing both a liquid phase and a solid phase of discrete cerium oxide nanoparticles. The liquid is then removed through a drying process (curing) to recover the nanoparticles. For example, the drying process may use a microwave oven.

The metal oxide or mixed metal oxide may be included in the catalyst component in an amount of from about 1% to about 50% by weight, or about 1% to about 45% by weight, or about 1% to about 40% by weight, or about 1% to about 30% by weight, or about 1% to about 20% by weight, or about 5% to about 20% by weight, or about 5% to about 15% by weight, or about 5% to about 15% by weight, or about 6% to about 12% by weight.

Polymeric Component of the Coating Material

In certain embodiments, the polymeric component of the coating material includes polymer(s) exhibiting hydrophobic properties and which contain at least one active functional group capable of chelating the catalyst component of the coating material. Suitable hydrophobic polymers include fluoropolymers, silicone polymers, and polyacrylates such as those derived from perfluoroalkyl acrylates/methacrylates, silicone containing acrylates/methacrylates, hydrocarbon containing acrylates/methacrylates and an acrylate co-monomer with at least one active methylene group.

Suitable monomers for the polymer component of the coating formation include, but are not limited to, 2-(perfluoroalkyl)ethyl methacrylate (Zonyl™ commercially available from DuPont), 1,1,1,3,3,3-hexafluoroisopropyl acrylate, 2,2,2-trifluoroethyl acrylate, 2,2,3,3,3-pentafluoropropyl acrylate, 2,2,3,3,4,4,4-heptafluorobutyl acrylate, 2,2,3,3,4,4,5,5,6,6,7,7,8,8,9,9,10,10,11,11-eicosafluoroundecyl acrylate, 2,2,3,3,4,4,5,5,6,6,7,7,8,8,9,9,-hexadecafluoronyl acrylate, 2,2,3,3,4,4,5,5,6,6,7,7-dodecafluoroheptyl acrylate, 2,2,3,3,4,4,5,5-octafluoropentyl acrylate, 2,2,3,3-tetrafluoropropyl acrylate, 2,2,3,3,4,4,4-hexacluorobutyl acrylate, 1,1,1,3,3,3-hexafluoroisopropyl methacrylate, 2,2,2-trifluoroethyl methacrylate, 2,2,3,3,3-pentafluoropropyl methacrylate, 2,2,3,3,4,4,4-heptafluorobutyl methacrylate, 2,2,3,3,4,4,5,5-octafluoropentyl methacrylate, 2,2,3,3-tetrafluoropropyl methacrylate, acrylate or methacrylate-terminated polyhedral oligomeric silsesquioxane (POSS), styryl-terminated POSS, poly(dimethylsiloxane-co-diphenylsiloxane) (divinyl terminated), poly(dimethylsiloxane) (vinyl terminated), Suitable non-fluorinated monomers such as acrylic monomers, vinyl ester monomers, or styrene monomers can also be used as co-monomers in the polymerization process described herein. They may be used alone or in combination with other non-fluorinated acrylic monomers. Examples of suitable non-fluorinated acrylic monomers include, but are not limited to, ethylenically unsaturated polymerizable d-C8 alkyl esters of acrylic and methacrylic acid. These include methylacrylate, ethylacrylate, butyl acrylate, 2-ethyl-hexyl acrylate and the corresponding methacrylates.

Examples of vinyl ester monomers include, but are not limited to, vinyl acetate, vinyl propionate, vinyl pivalate, vinyl laurate, vinyl 2-ethyl hexanoate, dibutyl maleate, dioctyl maleate, diisopropyl maleate, diisopropyl fumarate, versatic acid vinyl esters having 9 to 12 carbon atoms, and preferably 9 to 10 carbon atoms, or mixtures thereof.

Examples of styrenic monomers include, but are not limited to, styrene, alpha-methyl styrene, and 4-chlorobenzyl styrene.

Suitable co-monomers containing an active methylene group include, but are not limited to, 2-(methacryloyloxy)ethyl acetoacetate and mono-2-(methacryloyloxy)-ethyl maleate.

The above monomers and co-monomers may be polymerized to form the hydrophobic polymer using either random copolymerization and/or block copolymerization using free radical solution or emulsion polymerization techniques known to those skilled in the art. The resulting hydrophobic polymer may be included in the polymeric component in an amount of from about 1% to about 99% by weight, or about 5% to about 95% by weight, or about 10% to about 90% by weight, or about 10% to about 80% by weight, or about 10% to about 70% by weight, or about 10% to about 60% by weight, or about 10% to about 50% by weight, or about 10% to about 40% by weight, or about 15% to about 40% by weight, or about 15% to about 30% by weight, or about 20% to about 30% by weight.

In certain embodiments, the polymeric component of the coating material includes polymer(s) which may include the following: 1) Polymers which have structures with a substantially fluorinated carbon chain optionally having attached to it side chains that are substantially fluorinated. These polymers contain sulfonic acid groups or derivatives of sulfonic acid groups, carboxylic acid groups or derivatives of carboxylic acid groups, phosphonic acid groups or derivatives of phosphonic acid groups, phosphoric acid groups or derivatives of phosphoric acid groups and/or mixtures of these groups. Perfluorinated polymers include Nafion®, Flemion®, and Aciplex® commercially available from E. I. DuPont de Nemours, Asahi Glass KK and Asahi Chemical Industry respectively. 2) Perfluorinated or partially fluorinated polymers containing aromatic rings which have been functionalized with $SO_3H$, $PO_2H_2$, $PO_3H_2$, $CH_2PO_3H_2$, $COOH$, $OSO_3H$, $OPO_2H_2$, $OPO_3H_2$. Also included are radiation or chemically grafted perfluorinated polymers, in which a perfluorinated carbon chain, for example, polytetrafluoroethylene (PTFE), fluorinated ethylene-propylene (FEP), tetrafluoroethylene-ethylene (ETFE) copolymers, tetrafluoroethylene-perfluoroalkoxy (PFA) copolymers, poly (vinyl fluoride) (PVF) and poly (vinylidene fluoride) (PVDF) is activated by radiation or chemical initiation in the presence of a monomer, such as styrene, which can be functionalized to contain an ion exchange group. 3) Nonfluorinated polymers including hydrocarbons such as styrene-(ethylene-butylene)-styrene, styrene-(ethylene-propylene)-styrene and acrylonitrile-butadiene-styrene co- and terpolymers where the styrene components are functionalized with sulphonate, phosphoric and/or phosphonic groups. 4) Nitrogen containing polymers, for example, polybenzimidazole alkyl sulphonic acid, and polybenzimidazole alkyl or aryl phosphonate.

In certain embodiments, the polymeric component of the coating material includes non-toxic, non-flammable perfluoroalkyl chains that are capable of producing low free energy surface below 25 dynes/cm and preferably below 18 dynes/cm and most preferably below 12 dynes/cm. The coating can work by preventing adherence of a carcinogen or other harmful material to the surface of a textile or other substrate. For example, carcinogenic combustion products are usually organic compounds which have an affinity to compounds such as oil based materials. The ability to prevent the carcinogenic compounds from adhering to a treated textile may come from the applied coating's oleophobicity. The higher the oleophobicity of the coating, the greater the repellency of the compounds. The repellency protects the coated textile from carcinogens adhering to the surface. Additionally, through incorporation of specific compounds such as metal oxides more preferably oxides of titanium, zirconium, vanadium, zinc, iron, platinum, gold, silver, palladium manganese and magnesium, the coating may have the ability to prevent polymerization of oils on surfaces, allowing for self-cleaning of the surface.

Coating Material

The metal oxide component, the catalytic component, and the polymeric component of the coating material can be combined in any suitable manner. For instance, they can be applied as separate layers to form a coating on a substrate. Alternatively, all three components can be mixed together and then applied as a coating mixture. In addition, the polymeric component can be mixed with the polymeric component and applied, followed by the catalytic compound. In another method, they can be applied separately onto a substrate in a manner so that they mix together as they form a coating. Alternatively, the catalytic component and the metal oxide component can be formed in situ within the polymer.

The above-mentioned U.S. Pat. No. 8,883,935 by Lalgudi et al. discloses introducing metal oxide nanoparticles into polymer matrices by various mixing methods.

The catalytic component and the metal oxide component can be dispersed in the polymeric component by any suitable method, such as by using a high-speed and/or high-sheer mixer. U.S. Pat. No. 9,000,203 by Lalgudi et al. (incorporated by reference herein), issued Apr. 7, 2015, in Example 8 discloses the use of a Flaktek High-Sheer Mixer to disperse nanoparticles in a polymer by mixing at 2800 rpm for 1 minute.

U.S. Pat. No. 7,879,935 by Lalgudi et al (incorporated by reference herein), issued Feb. 1, 2011, discloses a method for production of metal oxide nanoparticles dispersed in polymers. The nanoparticles may be formed in situ within the polymer. In certain embodiments, the method is used to formulate the coating in a binder system to control the particle size of the nanoparticles (for optimal catalyst efficiency) and longer lasting adhesion to a substrate such as a fabric.

International Publication No. WO 2008/085550 A2 by Heintz et al, published Jul. 17, 2008, discloses a nanomaterial grafted to a polymer containing an active functional group to produce a coating. The coating may further include a liquid carrier which facilitates the application of the coating to a substrate surface.

The coating material may be applied to the substrate by any suitable method. Various coating methods that may be used include dipping, spraying, brushing, roller coating and e-spraying. For example, they may be applied by dip coating the substrate in the uncured polymer, and dip coating the substrate in a solution of the catalytic and metal oxide components. In one embodiment, the substrate is first dip coated in an uncured polymer, and then dip coated in a cerium oxide nanoparticle solution before the polymer is cured. Then the polymer is cured to form the two-layer coating.

The coating material may also be applied by spraying. For example, the uncured polymer and the catalyst solution may be sprayed separately but simultaneously onto the substrate in a manner so that they mix together when forming a coating on the substrate. For instance, they may be sprayed by separate spray guns onto the surface of a fabric and mix together on the surface.

In another embodiment, the metal oxide component and the catalytic component can be combined as parts of the same compound. For example, they may be combined as parts of the amphiphilic compound described above in reference to the metal oxide component of the coating material. As shown in the above structure, the "M" can be a binary metal oxide. One part of the binary metal oxide can be a metal oxide catalyst such as cerium oxide. The other part of the binary metal oxide can be a metal oxide such as silicon. The "A2" part of the structure may be a hydrocarbon, fluorocarbon or silicone. The hydrocarbon, fluorocarbon and silicone part of the compound have hydrophobic properties that can reduce the adherence of harmful materials on a substrate, while the metal oxide catalyst part can modify or react with any harmful materials to make them less harmful.

In the above-mentioned combined chemical compound, the metal oxide catalyst part (providing a catalytic effect) and the hydrophobic groups attached to the metal oxide part (providing an anti-adherent effect) may be spaced apart in the compound by a sufficient distance so that they do not mask each other's effects. In certain embodiments, this may be accomplished by introducing a spacer group into the structure. For example, the spacer group may be a precursor of the metal oxide catalyst, such as a metal alkoxide, which is grafted to the catalyst. For instance, the spacer group may be cerium isopropoxide. In another embodiment, the spacer group may be any suitable type of ligand.

The coating material can have the ability to neutralize the carcinogens, toxic soot particles or other harmful materials and/or prevent the adherence of and/or shed carcinogens, toxic soot particles, other harmful materials and water.

In certain embodiments, the coating material is compatible with flexible textile matrices. The coating may have the ability to coat a wide range of different textiles from cotton to extruded fabrics.

In certain embodiments, the coating material is highly durable against abrasion and extreme environment, and resistant to microbial growth. In certain embodiments, the coating is covalently bonded to the surface of a textile or other substrate. This gives the coating the ability to not be washed or worn away. In an example, the durability of the coating was studied by using a scrubbing technique on the coated surface. The contact angle of an oil based stain was compared to a commercially available coating and a non-coated control. The contact angle is measured using ASTM D7490 method which is a measure of the angle between the substrate and the material applied. The larger the contact angle, the less the applied material wets the surface. The results of the treated substrate scrub tests showed that the coating material of the invention initially had the largest contact angle and still had the largest contact angle after 600 cycles.

In certain embodiments, the applied coating material has high thermal stability (e.g., stable at 500° C.), and high resistance to microbial growth (e.g., a 6 log reduction) as determined using ASTM E2180 test method. The ability to resist microbial growth is important for the longevity of the coating since microbes can accelerate the degradation of a coating.

In certain embodiments, the coating material is able to maintain efficacy for longer than five years without need for treatment or replacement. For example, the coating may have demonstrated efficacy for up to 600 scrub cycles, which is an order of magnitude larger than 60 monthly wash cycles expected during a five-year period.

When the coating material is deposited on a substrate, the deposited coating includes about 25 $mg/in^2$ to about 300 $mg/in^2$ of the polymeric component, about 50 $mg/in^2$ to about 250 $mg/in^2$, about 75 $mg/in^2$ to about 200 $mg/in^2$, or about 100 $mg/in^2$ to about 150 $mg/in^2$; and about 40 $mg/in^2$ to about 200 $mg/in^2$ of the metal oxide component, or about 50 $mg/in^2$ to about 175 $mg/in^2$, or about 60 $mg/in^2$ to about 150 $mg/in^2$, or about 70 $mg/in^2$ to about 125 $mg/in^2$, or about 80 $mg/in^2$ to about 100 $mg/in^2$; and about 1 $mg/in^2$ to about 25 $mg/in^2$ of the catalytic component, or about 1 $mg/in^2$ to about 20 $mg/in^2$, or about 1 $mg/in^2$ to about 15 $mg/in^2$, or about 3 $mg/in^2$ to about 15 $mg/in^2$, or about 3 $mg/in^2$ to about 10 $mg/in^2$, or about 5 $mg/in^2$ to about 15 $mg/in^2$, or about 5 $mg/in^2$ to about 10 $mg/in^2$, or about 5 $mg/in^2$ to about 7 $mg/in^2$.

Uses for the Coating Material

The coating material of the invention may have many different uses. For example, as described above, the coating may be used for protective purposes, or it may be used in health care applications.

When the coating material is used for protective purposes, the polymeric component provides a first protective function. For example, it can work as an anti-adherent to reduce the adherence of harmful materials on clothing. The catalytic component provides a second protective function. For example, it can work to catalytically modify materials that come into contact with the coating to make them less harmful. Alternatively, the polymeric component and the catalytic component may have additional and/or other functions.

The coating material can be applied to many different types of substrate to provide protection from harmful materials. For example, the coating may be applied to textiles or fabrics for uses in different applications, such as the production of clothing.

Coating Material Applied to Personal Protective Clothing

In certain embodiments, the coating material is applied to the outer surface of personal protective clothing to protect the wearer from harmful materials in the environment. Protective clothing can include, for example, turnout clothing, fire proximity suits and hazmat suits, which are worn by firefighters and first responders. A firefighter's turnout clothing usually includes a combination of a uniform shirt, uniform trousers, a jacket, trousers, gloves, boots, hoods, and helmets. Protective clothing may also be worn by personnel in law enforcement, the military, cleaning or repair services, the construction industry and otspechers.

Lion Group, Inc., which is headquartered in Dayton, Ohio, USA, manufactures and sells an extensive selection of high quality personal protective clothing and gear. The company also owns a number of related U.S. patents and patent applications. Some of their recent patents include: U.S. Pat. Nos. 8,973,169; 8,719,969; 8,701,218; 8,650,668; 8,522,368; 8,479,321; 8,332,963; 8,327,469; 8,104,100; 7,996,920; 7,958,569; 7,913,322; 7,395,555 and 7,168,103.

Lion's U.S. Patent Application No. 2015/0224349 A1, published Aug. 13, 2015, defines a protective garment generally as including a heat, flame and abrasion resistant outer shell configured to be worn on at least part of a body of a wearer. More particularly, as described in the Lion patent application, FIG. 1 illustrates a protective or hazardous duty garment in the form of a firefighter's coat. The coat may include a body portion having a left front panel, right front panel, and a back panel. The left front panel and right front panel may be releasably attachable by a fastener, such as a zipper, snaps, clasps, clips, hook-and-loop fastening material, or the like. The body portion may define a torso cavity that is shaped and configured to receive a wearer's torso therein. The garment may include a pair of sleeves coupled to and extending generally outwardly from the body portion and shaped to receive a wearer's arms therein.

The garment may include various layers through its thickness to provide various heat, moisture and abrasion resistant qualities to the garment so that the garment can be used as a protective, hazardous duty, and/or firefighter garment. For example, the garment may include an outer shell, a moisture barrier located inside of and adjacent to the outer shell, a thermal liner or barrier located inside of and adjacent to the moisture barrier, and an inner liner or face cloth located inside of and adjacent to the thermal barrier.

The outer shell may be made of or include a variety of materials, including a flame, heat and abrasion resistant material such as a compact weave of aramid fibers and/or polybenzamidazole fibers. Commercially available aramid materials include NOMEX and KEVLAR fibers (both trademarks of E.I. DuPont de Nemours & Co., Inc. of Wilmington, Del.), and commercially available polybenzamidazole fibers include PBI fibers (a trademark of PBI Performance Fabrics of Charlotte, N.C.). Thus, the outer shell may be an aramid material, a blend of aramid materials, a polybenzamidazole material, a blend of aramid and polybenzamidazole materials, or other appropriate materials. The outer shell can also be made of a thermostable organic polymer material, such as KERMEL® material sold by Kermel SAS of Colmar, France. The outer shell may be coated with a coating material according to the present invention to protect the wearer.

The moisture barrier and thermal barrier may be generally coextensive with the outer shell, or spaced slightly inwardly from the outer edges of the outer shell (i.e., spaced slightly inwardly from the outer ends of the sleeves, the collar and from the lower edge of the garment) to provide moisture and thermal protection throughout the garment. The moisture barrier may include a semi-permeable membrane layer and a substrate.

The membrane layer may be generally water vapor permeable but generally impermeable to liquid moisture. The membrane layer may be made of or include expanded polytetrafluoroethylene such as GORE-TEX or CROSSTECH materials (both of which are trademarks of W.L. Gore & Associates, Inc. of Newark, Del.), polyurethane-based materials, neoprene-based materials, cross-linked polymers, polyamid, or other materials. The membrane layer may have microscopic openings that permit moisture vapor (such as water vapor) to pass therethrough, but block liquids (such as liquid water) from passing therethrough. The membrane layer may be made of a microporous material that is either hydrophilic, hydrophobic, or somewhere in between. The membrane layer may also be monolithic and may allow moisture vapor transmission therethrough by molecular diffusion. The membrane layer may also be a combination of microporous and monolithic materials (known as a bicomponent moisture barrier), in which the microporous or monolithic materials are layered or intertwined.

The membrane layer may be bonded or adhered to a substrate of a flame and heat resistant material to provide structure and protection to the membrane layer. The substrate may be or include aramid fibers similar to the aramid fibers of the outer shell, but may be thinner and lighter in weight. The substrate may be woven, non-woven, spunlace or other materials. The membrane layer may be located between the outer shell and the substrate, or the substrate may be located between the outer shell and the membrane layer.

The thermal barrier may be made of nearly any suitable flame resistant material that provides sufficient thermal insulation. In one embodiment, the thermal barrier may include a layer of bulk material in the form of relatively thick (i.e. between about $\frac{1}{16}"$-$\frac{3}{16}"$) batting, felt or needled non-woven bulk or batting material. The bulk material can include aramid fiber batting (such as NOMEX batting), aramid needlepunch material, an aramid non-woven material, an aramid blend needlepunch material, an aramid blend batting material, an aramid blend non-woven material, foam (either open cell or closed cell), or other suitably thermally insulating materials. The bulk material may trap air and possess sufficient loft to provide thermal resistance to the garment.

The bulk material may be quilted to a thermal barrier face cloth which can be a weave of a lightweight aramid material. Thus, either the bulk material alone, or the bulk material in combination with the thermal barrier face cloth, may be considered to constitute the thermal barrier. The thermal barrier bulk material may be located between the outer shell and the thermal barrier face cloth, or the face cloth may be located between the outer shell and the bulk layer. In one embodiment, the thermal barrier (or the garment as a whole) may have a thermal protection performance ("TPP") of at least about twenty, and the garment as a whole may have a TPP of at least about thirty-five. If desired, the thermal barrier may be treated with a water-resistant or water-repellent finish.

The face cloth may be the innermost layer of the garment, located inside the thermal barrier and moisture barrier. The face cloth can provide a comfortable surface for the wearer and protect the thermal barrier and/or moisture barrier from abrasion and wear. The face cloth may be quilted to the adjacent layer (i.e. the thermal barrier in the illustrated embodiment). However, the face cloth is optional and may be excluded if desired. In addition, the garment may not necessarily include the moisture barrier and/or the thermal barrier in certain cases.

Each layer of the garment and the garment as a whole may meet the National Fire Protection Association ("NFPA") 1971 standards for protective firefighting garments ("Protective Clothing for Structural Firefighting"). The NFPA standards specify various minimum requirements for heat and flame resistance and tear strength. Alternatively or in addition to the NFPA Standard 1971, the garment may also meet European Norm ("EN") standards for firefighting garments set by the European Committee for Standardization (also known as Comite Europeen de Normalisation ("CEN")).

The coating material can be coated on one or more layers of the garment, as desired. The coating thickness is typically in the range of about 10 nm to about 10 microns.

Modification of Carcinogens by Catalytic Component of the Coating Material

As discussed above, PAHs are a major carcinogenic component of smoke produced by residential, industrial and forest fires.

In certain embodiments, the catalytic component of the coating material can catalytically modify carcinogens to make them less harmful. For example, cerium oxide has the ability to decompose benzo(a)pyrene and other carcinogens by catalytic oxidation. It is believed that cerium(IV) oxide, which is cerium oxide in its higher oxidation state, is particularly effective.

The oxidation state and the concentration of the catalytic component of the coating may be controlled by adding additives such as citric acid, tartaric acid, ethylenediaminetetraacetic acid, arginine, N-acetyl cysteine, DTPPH (diethylenetriaminepenta(methylenephosphonic acid), NTMP (nitrilotris(methylenephosphonic acid), HEDP (1-hydroxyethane-1,1-diphosphonic acid) and nitrilotriacetic acid for maximum effectiveness against carcinogens and other harmful materials. The compatibility of the cerium oxide in the catalyst component with the polymer component of the coating may be maximized by adjusting the pH and/or preparing the catalyst component in non-aqueous solvent such as acetone, methyl ethyl ketone, toluene and/or hexane, or adjusting the surface energy of the polymer component of the coating by varying its composition.

Modification of Carcinogens by Ceria at Low Temperature and Without Noble Metals The potential of ceria (cerium oxide) to oxidize hydrocarbons has been known for several years. However, previously it was reported that ceria can efficiently operate only at relatively high or intermediate temperatures (above 300° C.).

However, it has been found that the coating materials containing ceria nanoparticles, having a particle size of 200 nm or less, can efficiently oxidize hydrocarbon carcinogens at low or moderate temperatures (e.g., below 100° C., below 80° C., or about 40° C. to about 60° C.).

Also, previously it was reported that ceria was required to be in intimate contact with a noble metal (such as Pd, Pt or Rh) for efficient catalytic oxidation of hydrocarbons.

In the present invention, however, it has been found that the coating materials containing ceria nanoparticles can efficiently oxidize hydrocarbon carcinogens without requiring the presence of a noble metal.

While not intending to be limited by theory, it is believed that a flat band effect (or high surface oxygen vacancy concentration) occurring for the ceria nanoparticles below a certain particle size may allow the ceria nanoparticles to efficiently catalyze oxidation of hydrocarbon carcinogens at low temperature and without requiring a noble metal.

Uses of the Coating Material in Health Care Applications

The coating material of the invention may also be used in health care applications. In one embodiment, the coating material is used for wound healing. By way of background, the supply of oxygen to wounds can speed wound healing by a number of beneficial effects. The effects include, for example, increased anti-bacterial activity, increased cell metabolism and energy production, and increased rate and quality of new blood vessel growth.

Because oxygen is volatile, it is often difficult to supply oxygen directly to wounds. However, oxygen can be supplied indirectly to a wound by decomposing a reactive oxygen species ("ROS") near the wound. An example of an ROS is hydrogen peroxide. The decomposition of the reactive oxygen species causes the release of oxygen. The catalytic component of the coating material of the invention, for example cerium oxide, is able to catalyze the decomposition of reactive oxygen species and thereby release oxygen.

The wound healing by supply of oxygen can be accomplished in any suitable manner. For example, International Publication No. WO 2015/112807, published Jul. 30, 2015, discloses a wound dressing system comprising a wrap and a frangible ampule. The wrap is configured to contact/surround a wound site and includes an oxygen catalyst. The ampoule includes an oxygen precursor. The catalyst and precursor are configured to form oxygen when combined. Similar disclosures are in WO 2015/081,151, published Jun. 4, 2015, and WO 2015/112,810, published Jul. 30, 2015.

In another embodiment, the coating material is used in a diagnostic method. For example, the coating material can be used for coating or encapsulating tracer nanoparticles used for detecting and treating cancers. When the coating material comes into contact with cancerous cells, the catalytic component of the coating can cause catalytic oxidation of the cells and thereby degrade or destroy them.

In another embodiment, the coating material is coated on a medical device, such as a catheter.

Composition

Another aspect of the invention is a composition including a metal oxide component, a catalytic component, and a polymeric component. These components can be mixed together to form the composition. The components are described above. Solvents for the composition include, but are not limited to, water, isopropanol, acetone, methyl ethyl ketone, toluene, hexane, and or combinations thereof. The metal oxide component, the catalytic component, and the polymeric component are included in the composition in amounts so that when the composition is deposited on the substrate, the deposited coating will include about 25 mg/in$^2$ to about 300 mg/in$^2$ of the polymeric component, about 50 mg/in$^2$ to about 250 mg/in$^2$, about 75 mg/in$^2$ to about 200 mg/in$^2$, or about 100 mg/in$^2$ to about 150 mg/in$^2$; and about 40 mg/in$^2$ to about 200 mg/in$^2$ of the metal oxide component, or about 50 mg/in$^2$ to about 175 mg/in$^2$, or about 60 mg/in$^2$ to about 150 mg/in$^2$, or about 70 mg/in$^2$ to about 125 mg/in$^2$, or about 80 mg/in$^2$ to about 100 mg/in$^2$; and about 1 mg/in$^2$ to about 25 mg/in$^2$ of the catalytic component, or about 1 mg/in$^2$ to about 20 mg/in$^2$, or about 1 mg/in$^2$ to about 15 mg/in$^2$, or about 3 mg/in$^2$ to about 15 mg/in$^2$, or about 3 mg/in$^2$ to about 10 mg/in$^2$, or about 5 mg/in$^2$ to about 15 mg/in$^2$, or about 5 mg/in$^2$ to about 10 mg/in$^2$, or about 5 mg/in$^2$ to about 7 mg/in$^2$.

EXAMPLES

Example 1—Preparation of Metal Oxide Component

The metal oxide component of the coating was prepared by charging 8 g aminopropyltrimethyoxy silane (AMPTS Sigma #281778), 8 g (tridecafluror-1,1,2,2-tetrahydrooctyl) triethoxy silane (Gelest SIT 8175.0), 40 g isopropanol (IPA), and 0.03 g glacial acetic acid together. The mixture was stirred overnight. The solution was clear, colorless, and had solids of about 28.6%.

U.S. Pat. No. 8,883,935 by Lalgudi et al (incorporated by reference herein), issued Nov. 11, 2014, discloses additional guidance for the synthesis of metal oxide component of the coating in Examples 2 and 6.

Example 2—Preparation of Catalyst Component 40 g of ammonium cerium (IV) nitrate, (Sigma #C3654) was dissolved in 100 g of deionized (DI) water. Once the solid was dissolved, a sonicating horn (Sonicator=Misonix Sonicator 3000, horn=Misonix Inc. Model #4,~¼-½") was placed into the cerium solution. The solution was sonicated, then 24 ml of tetramethylammonium hydroxide (TMAH, 25% in water, Sigma #331635) was added. Once all the TMAH had been charged, the solution was sonicated for another 8-10 minutes. The solution was a clear yellow/orange solution with a pH about 1, and had solids of about 7.5%

Example 3: Procedure to Coat the Fabric 6 g of the metal oxide component obtained from Example 1 was diluted with 160 g isopropanol (IPA). This solution was sprayed onto a 6"×6" piece of Nomex® test fabric using a Preval sprayer, by holding the sprayer about 6" away from the fabric. The sprayer was moved from left to right, then right to left, and each pass was overlapped by about ½". Once the entire fabric was coated, gentle heat was applied using a heat gun to remove the IPA. The heat was warm to the touch (about 40° C.-45° C.). The heat was applied in a side to side motion, and was continued until the fabric was dry. The fabric was rotated 90°, and the coating steps were repeated three more times. The amount of coating material applied was less than 100 mg after drying. Once the fabric was treated with the metal oxide component, the catalyst component obtained from example 2 was applied in a similar manner, except that heat was not used to remove the water. The solution was used as prepared with no further dilution. Once the desired Ce loading was deposited, the fabric was cured in an oven at 120° C. for 1 hour.

Example 4: Evaluation of Catalytic Activity

The coated fabric obtained from Example 3 was cut into several pieces (1 inch×1 inch), and 300 microliters of B(a)P was placed onto each test sample. The test samples were kept in a chamber that was maintained at a temperature 25±3° C. The test samples were periodically withdrawn and extracted with 10 mL of acetonitrile for 5 minutes at ambient conditions. The extracts were treated with Amberlyst A-36 ion exchange resin to remove any residual cerium. The extracted solution was analyzed for the presence of B(a)P using high performance liquid chromatography (HPLC) with a UV-VIS detector. The results are compared with uncoated fabric and shown in the below table. The fabric coated with the coating material reduced the toxic B(a)P more than 70% within four weeks at room temperature.

TABLE

Evaluation of catalytic activity of test fabrics against the toxic material B(a)P

| Fabric Type | Exposure time (weeks) | |
| --- | --- | --- |
| | 2 | 4 |
| Test Fabric obtained from Example 3 | 36 ± 14 | 72 ± 13 |
| Control Test Fabric (No coating) | 0 | 15 ± 6 |

Specific Embodiments

The following specific embodiments are intended for purposes of illustration and are not intended to limit the scope of the description or claims.

One embodiment involves a coating material. 1. A coating material comprising: a polymeric component; a metal oxide component; and a catalytic component, the catalytic component comprising a metal oxide or a mixed metal oxide which is an effective catalyst for an oxidation reaction. 2. The coating material of claim 1 wherein the polymeric component comprises a fluorocarbon polymer. 3. The coating material of any one of claims 1-2 wherein the fluorocarbon polymer includes perfluoroalkyl chains having a surface energy greater than or equal to 7 dynes per centimeter. 4. The coating material of any one of claims 1-3 wherein the polymeric component comprises a cationic polymer. 5. The coating material of any one of claims 1-4 wherein the metal oxide component comprises an amphiphilic compound with the following structural formula:

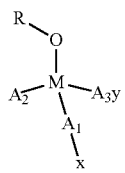

where M=metal oxide or binary metal oxide,
A$_1$ is selected from compounds with surface energy greater than or equal to 25 dynes per centimeter, $A_2$ is selected from compounds with surface energy less than or equal to 12 dynes per centimeter, $A_3$ is selected from compounds having more than one reactive functional group, x=$NH_2$, NHR' or $NR'_2$ (R'=methyl, ethyl, propyl or isopropyl), y=COOH, $SO_3H$ or $PO_3H$, and R=H or halogen; and where one of the $A_{1-x}$, $A_2$, or $A_{3-y}$ may be replaced by a second O—R;

or

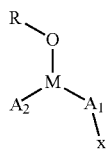

where M=metal oxide or binary metal oxide, $A_1$ is selected from compounds with surface energy greater than or equal to 25 dynes per centimeter, $A_2$ is selected from compounds with surface energy greater than or equal to 7 dynes per centimeter, x=$NH_2$, NHR' or $NR'_2$ (R'=methyl, ethyl, propyl or isopropyl), and R=H or halogen; and where one of the $A_{1-x}$, or $A_2$ may be replaced by a second O—R. 6. The coating material of any one of claims 1-5 wherein the catalytic component comprises metal oxide nanoparticles. 7. The coating material of any one of claims 1-6 wherein the catalytic component comprises cerium oxide. 8. The coating material of any one of claims 1-7 wherein the metal oxide component, the catalytic component, and the polymeric component are combined as separate layers on a substrate. 9. The coating material of any one of claims 1-8 wherein the metal oxide component and the polymeric component are mixed together and applied to a substrate, and wherein the catalytic component is applied separately to the substrate. 10. The coating material of any one of claims 1-9 wherein the catalytic component and the metal oxide component are combined as parts of the same compound. 11. The coating material of any one of claims 1-10 wherein the catalytic component and the metal oxide component are separated by a spacer group in the compound. 12. The coating material of any one of claims 1-11 wherein the coating material is used for a protective purpose, the polymeric component providing a first protective function and the catalytic component providing a second protective function. 13. The coating material of any one of claim 1-12 wherein the polymeric component functions as an anti-adherent material to reduce adherence of harmful material on a substrate, and the catalytic component functions to catalytically modify harmful material that comes into contact with the coating material to make the harmful material less harmful. 14. The coating material of any one of claims 1-13 wherein the harmful material comprises a polycyclic aromatic hydrocarbon. 15. The coating material of any one of claims 1-14 wherein the coating material is applied as a coating on personal protective clothing. 16. The coating material of any one of claims 1-15 wherein the catalytic component comprises cerium oxide nanoparticles having a particle size of 200 nm or less, and wherein the catalytic component is effective to oxidize a polycyclic aromatic hydrocarbon at a temperature below 100° C. 17. The coating material of any one of claims 1-16 wherein the catalytic component comprises cerium oxide nanoparticles having a particle size of 200 nm or less, and wherein the catalytic component is effective to oxidize a polycyclic aromatic hydrocarbon without requiring the presence of a noble metal. 18. The coating material of any one of claims 1-17 wherein the coating material is used in a health care application. 19. The coating material of any one of claims 1-18 wherein the health care application is wound healing. 20. The coating material of any one of claims 1-19 wherein the health care application is the coating or encapsulation of tracer nanoparticles for treating cancer. 21. The coating material of any one of claims 1-20 wherein the deposited coating comprises 25 mg/in² to 300 mg/in² of the polymeric component, 40 mg/in² to 200 mg/in² of the metal oxide component, and 1 mg/in² to 25 mg/in² of the catalytic component.

Another embodiment involves a coated personal protective clothing item. 22. A coated personal protective clothing item comprising: a personal protective clothing substrate; a coating on the personal protective clothing substrate, the coating comprising a coating material comprising: a polymeric component; a metal oxide component; and a catalytic component, the catalytic component comprising a metal oxide or a mixed metal oxide which is an effective catalyst for an oxidation reaction. 23. The coated personal protective clothing item of claim 22 wherein the coating material comprises 100 mg/in2 to 150 mg/in2 of the polymeric component, 80 mg/in2 to 100 mg/in2 of the metal oxide component, and 5 mg/in2 to 7 mg/in2 of the catalytic component. 24. The coated personal protective clothing item of any one of claims 22-23 wherein the polymeric component comprises a fluorocarbon polymer. 25. The coated personal protective clothing item of any one of claims 22-24 wherein the metal oxide component comprises an amphiphilic compound with the following structural formula:

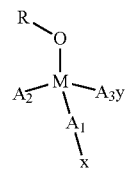

where M=metal oxide or binary metal oxide, $A_1$ is selected from compounds with surface energy greater than or equal to 25 dynes per centimeter, $A_2$ is selected from compounds with surface energy less than or equal to 12 dynes per centimeter, $A_3$ is selected from compounds having more than one reactive functional group, x=$NH_2$, NHR' or $NR'_2$ (R'=methyl, ethyl, propyl or isopropyl), y=COOH, $SO_3H$ or $PO_3H$, and R=H or halogen; and where one of the $A_{1-x}$, $A_2$, or $A_{3-y}$ may be replaced by a second O—R;

or

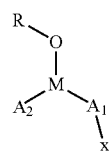

where M=metal oxide or binary metal oxide, $A_1$ is selected from compounds with surface energy greater than or equal to 25 dynes per centimeter, $A_2$ is selected from compounds with surface energy greater than or equal to 7 dynes per centimeter, x=$NH_2$, NHR' or NR'$_2$ (R'=methyl, ethyl, propyl or isopropyl), and R=H or halogen; and where one of the $A_{1-x}$, or $A_2$ may be replaced by a second O—R. In certain embodiments, the composition includes both the $A_{1-x}$, and $A_2$ groups. 26. The coated personal protective clothing item of any one of claims 22-25 wherein the catalytic component comprises cerium oxide. 27. The coated personal protective clothing item of any one of claim 22-26 wherein the metal oxide component, the catalytic component, and the polymeric component are combined as separate layers on the personal protective clothing substrate. 28. The coated personal protective clothing item of any one of claims 22-27 wherein the metal oxide component and the polymeric component are mixed together and applied to the personal protective clothing substrate, and wherein the catalytic component is applied separately to the personal protective clothing substrate. 29. The coated personal protective clothing item of any one of claims 22-28 wherein the polymeric component functions as an anti-adherent material to reduce adherence of harmful material on the coated personal protective clothing substrate, and the catalytic component functions to catalytically modify harmful material that comes into contact with the coating material to make the harmful material less harmful. 30. The coated personal protective clothing item of any one of claims 22-29 wherein the harmful material comprises a polycyclic aromatic hydrocarbon. 31. The coated personal protective clothing item of any one of claims 22-30 wherein the catalytic component comprises cerium oxide nanoparticles having a particle size of 200 nm or less, and wherein the catalytic component is effective to oxidize a polycyclic aromatic hydrocarbon at a temperature below 100° C. 32. The coating material of any one of claims 22-31 wherein the catalytic component comprises cerium oxide nanoparticles having a particle size of 200 nm or less, and wherein the catalytic component is effective to oxidize a polycyclic aromatic hydrocarbon without requiring the presence of a noble metal.

Another embodiment is a method of oxidizing a hydrocarbon carcinogen. 33. A method of oxidizing hydrocarbon carcinogens comprising: applying the coating material of any of claims 1-21 to a substrate; exposing the coating material on the substrate to a hydrocarbon carcinogen, wherein the catalytic component of the coating material oxidizes the hydrocarbon carcinogen. 34. The method of claim 33 wherein the catalytic component comprises cerium oxide nanoparticles having a particle size of 200 nm or less, and wherein the catalytic component is effective to oxidize a polycyclic aromatic hydrocarbon at a temperature below 100° C. 35. The method of any one of claims 33-34 wherein the catalytic component comprises cerium oxide nanoparticles having a particle size of 200 nm or less, and wherein the catalytic component is effective to oxidize a polycyclic aromatic hydrocarbon without requiring the presence of a noble metal. 36. The method of any one of claims 33-35 wherein the deposited coating comprises 25 mg/in$^2$ to 300 mg/in$^2$ of the polymeric component, 40 mg/in$^2$ to 200 mg/in$^2$ of the metal oxide component, and 1 mg/in$^2$ to 25 mg/in$^2$ of the catalytic component.

Another embodiment is a composition. 37. The composition comprising: a polymeric component; a metal oxide component; and a catalytic component, the catalytic component comprising a metal oxide or a mixed metal oxide which is an effective catalyst for an oxidation reaction. 38. The composition of claim 37 wherein the polymeric component comprises a fluorocarbon polymer. 39. The composition of any one of claims 37-38 wherein the fluorocarbon polymer includes perfluoroalkyl chains having a surface energy greater than or equal to 7 dynes per centimeter. 40. The composition of any one of claims 37-39 wherein the polymeric component comprises a cationic polymer. 41. The composition of any one of claims 37-40 wherein the metal oxide component comprises an amphiphilic compound with the following structural formula:

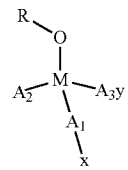

where M=metal oxide or binary metal oxide, $A_1$ is selected from compounds with surface energy greater than or equal to 25 dynes per centimeter, $A_2$ is selected from compounds with surface energy less than or equal to 12 dynes per centimeter, $A_3$ is selected from compounds having more than one reactive functional group, x=$NH_2$, NHR' or NR'$_2$ (R'=methyl, ethyl, propyl or isopropyl), y=COOH, $SO_3H$ or $PO_3H$, and R=H or halogen; and where one of the $A_{1-x}$, $A_2$, or $A_{3-y}$ may be replaced by a second O—R;

or

where M=metal oxide or binary metal oxide, $A_1$ is selected from compounds with surface energy greater than or equal to 25 dynes per centimeter, $A_2$ is selected from compounds with surface energy greater than or equal to 7 dynes per centimeter, x=$NH_2$, NHR' or NR'$_2$ (R'=methyl, ethyl, propyl or isopropyl), and R=H or halogen; and where one of the $A_{1-x}$, or $A_2$ may be replaced by a second O—R. 42. The composition of any one of claims 37-41 wherein the catalytic component comprises metal oxide nanoparticles. 43. The composition of any one of claims 37-42 wherein the catalytic component comprises cerium oxide. 44. The composition of any one of claims 37-43 wherein the catalytic component and the metal oxide component are combined as parts of the same compound. 45. The composition of any one of claims 37-44 wherein the catalytic component and the polymeric component are separated by a spacer group in the compound. 46. The composition of any one of claims 37-45 wherein the composition is used for a protective purpose, the polymeric component providing a first protective function and the catalytic component providing a second protective function. 47. The composition of any one of claims 37-46 wherein the polymeric component functions as an anti-adherent material to reduce adherence of harmful material on a substrate, and the catalytic component functions to catalytically modify harmful material that comes into contact with the composition to make the harmful material less harmful. 48. The composition of any one of claims 37-47 wherein the harmful material comprises a polycyclic aromatic hydrocarbon. 49. The composition of any one of claims 37-48 wherein the composition is applied as a coating on personal protective clothing. 50. The composition of any one of claims 37-49 wherein the catalytic component comprises cerium oxide nanoparticles having a particle size of 200 nm or less, and wherein the catalytic component is effective to oxidize a polycyclic aromatic hydrocarbon at a temperature below 100° C. 51. The composition of any one of claims 37-50 wherein the catalytic component comprises cerium oxide nanoparticles having a particle size of 200 nm or less, and wherein the catalytic component is effective to oxidize a polycyclic aromatic hydrocarbon without requiring the presence of a noble metal. 52. The composition of any one of claims 37-51 wherein the composition is used in a health care application. 53. The composition of any one of claims 37-52 wherein the health care application is wound healing. 54. The composition of any one of claims 37-53 wherein the health care application is the coating or encapsulation of tracer nanoparticles for treating cancer. 55. The composition of any one of claims 37-54 wherein the composition comprises 25 mg/in$^2$ to 300 mg/in$^2$ of the polymeric component, 40 mg/in$^2$ to 200 mg/in$^2$ of the metal oxide component, and 1 mg/in$^2$ to 25 mg/in$^2$ of the catalytic component.

By about, we mean within 10% of the value, or within 5%, or within 1%.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

The invention claimed is:

1. A coated personal protective clothing item comprising:
a personal protective clothing substrate;
a coating on the personal protective clothing substrate, the coating comprising a catalytic oxidation coating material comprising:
a polymeric component to reduce adherence of polyaromatic hydrocarbons to the clothing substrate;
a metal oxide component comprising an amphiphilic compound; and
a catalytic component, the catalytic component comprising a metal oxide or a mixed metal oxide which is a catalyst for catalytic oxidation of the polyaromatic hydrocarbons.

2. The clothing item of claim 1 wherein the metal oxide component comprises an amphiphilic compound with the following structural formula:

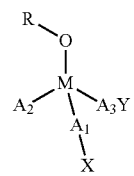

where M=metal oxide or binary metal oxide,
A$_1$ is selected from compounds with surface energy greater than or equal to 25 dynes per centimeter,
A$_2$ is selected from compounds with surface energy less than or equal to 12 dynes per centimeter,
A$_3$ is selected from compounds having more than one reactive functional group,
x=NH$_2$, NHR' or NR'$_2$ (R'=methyl, ethyl, propyl or isopropyl),
y=COOH, SO$_3$H or PO$_3$H, and
R=H or halogen; and
where one of the A$_1$-x, A$_2$, or A$_3$-y may be replaced by a second O—R;
or

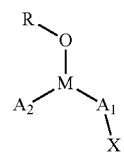

where M=metal oxide or binary metal oxide,
A$_1$ is selected from compounds with surface energy greater than or equal to 25 dynes per centimeter,
A$_2$ is selected from compounds with surface energy greater than or equal to 7 dynes per centimeter,
x=NH$_2$, NHR' or NR'$_2$ (R'=methyl, ethyl, propyl or isopropyl), and
R=H or halogen; and
where one of the A$_{1-x}$, or A$_2$ may be replaced by a second O—R.

3. The clothing item of claim 1 wherein the polymeric component comprises a fluorocarbon polymer.

4. The clothing item of claim 1 wherein the polymeric component comprises a fluorocarbon polymer including perfluoroalkyl chains having a surface energy greater than or equal to 7 dynes per centimeter, the catalytic component comprises cerium oxide, and wherein the metal oxide component comprises an amphiphilic compound with the following structural formula:

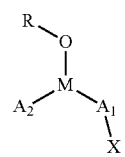

where M=metal oxide or binary metal oxide,
A$_1$ is selected from compounds with surface energy greater than or equal to 25 dynes per centimeter, $A_2$ is selected from compounds with surface energy greater than or equal to 7 dynes per centimeter, x=$NH_2$, NHR' or $NR'_2$ (R'=methyl, ethyl, propyl or isopropyl), and R=H or halogen; and where one of the $A_1$-x, or $A_2$ may be replaced by a second O—R.

5. The clothing item of claim 1 wherein the coating material comprises 25 mg/in² to 300 mg/in² of the polymeric component, 40 mg/in² to 200 mg/in² of the metal oxide component, and 1 mg/in² to 25 mg/in² of the catalytic component.

6. The clothing item of claim 1 wherein the catalytic component comprises cerium oxide nanoparticles having a particle size of 200 nm or less; and wherein the catalytic component is effective to oxidize a polycyclic aromatic hydrocarbon at a temperature below 100° C., or wherein the catalytic component is effective to oxidize a polycyclic aromatic hydrocarbon without requiring the presence of a noble metal.

7. The clothing item of claim 1 wherein the catalytic component comprises metal oxide nanoparticles.

8. The clothing item of claim 1 wherein the metal oxide component, the catalytic component, and the polymeric component are separate layers on the personal protective clothing substrate.

9. The clothing item of claim 1 wherein the metal oxide component and the polymeric component are mixed together and applied to the personal protective clothing substrate, and wherein the catalytic component is applied separately to the personal protective clothing substrate.

10. The clothing item of claim 1 wherein the catalytic component comprises cerium oxide nanoparticles having a particle size of 200 nm or less, and wherein the catalytic component is effective to oxidize a polycyclic aromatic hydrocarbon without requiring the presence of a noble metal.

11. The clothing item of claim 1 wherein the coating material comprises 50 mg/in² to 250 mg/in² of the polymeric component, 50 mg/in² to 175 mg/in² of the metal oxide component, and 1 mg/in² to 20 mg/in² of the catalytic component.

12. The clothing item of claim 1 wherein the polymeric component comprises a fluorocarbon polymer including perfluoroalkyl chains having a surface energy greater than or equal to 7 dynes per centimeter, the catalytic component comprises cerium oxide, and wherein the metal oxide component comprises an amphiphilic compound with the following structural formula:

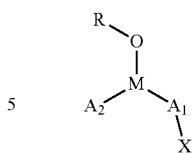

where M=metal oxide or binary metal oxide, $A_1$ is selected from compounds with surface energy greater than or equal to of 25 to 40 dynes per centimeter, $A_2$ is selected from compounds with surface energy greater than or equal to 7 dynes per centimeter, x=$NH_2$, NHR' or $NR'_2$ (R'=methyl, ethyl, propyl or isopropyl), and R=H or halogen; and where one of the $A_1$-x, or $A_2$ may be replaced by a second O—R.

13. The clothing item of claim 1 wherein the catalytic component comprises the metal oxide or the mixed metal oxide of a metal selected from one or more of cerium, cesium, zirconium, chromium, molybdenum, tungsten, lanthanum, silver, vanadium, manganese, iron, cobalt, nickel, or copper.

14. The clothing item of claim 1 wherein the polymeric component comprises a fluorocarbon polymer, a silicone polymer, or a polyacrylate polymer.

15. A coated personal protective clothing item comprising:
a personal protective clothing substrate;
a coating on the personal protective clothing substrate, the coating comprising a coating material comprising:
a polymeric component;
a metal oxide component comprising an amphiphilic compound; and
a catalytic component, the catalytic component comprising a metal oxide or a mixed metal oxide which is a catalyst for an oxidation reaction, wherein the metal oxide component and the polymeric component are mixed together and applied to the personal protective clothing substrate, and wherein the catalytic component is applied separately to the personal protective clothing substrate.

16. A coated personal protective clothing item comprising:
a personal protective clothing substrate;
a coating on the personal protective clothing substrate, the coating comprising a coating material comprising:
25 mg/in² to 300 mg/in² of a polymeric component;
40 mg/in² to 200 mg/in² of a metal oxide component comprising an amphiphilic compound; and
1 mg/in² to 25 mg/in² of a catalytic component, the catalytic component comprising a metal oxide or a mixed metal oxide which is a catalyst for an oxidation reaction.

* * * * *